US012663338B2

(12) United States Patent
Ono

(10) Patent No.: US 12,663,338 B2
(45) Date of Patent: Jun. 23, 2026

(54) OPTICAL REFLECTOMETRY DEVICE AND METHOD

(71) Applicant: NTT, Inc., Tokyo (JP)

(72) Inventor: Shingo Ono, Musashino (JP)

(73) Assignee: NTT, Inc., Tokyo (JP)

( * ) Notice: Subject to any disclaimer, the term of this patent is extended or adjusted under 35 U.S.C. 154(b) by 174 days.

(21) Appl. No.: 18/688,116

(22) PCT Filed: Sep. 17, 2021

(86) PCT No.: PCT/JP2021/034316
§ 371 (c)(1),
(2) Date: Feb. 29, 2024

(87) PCT Pub. No.: WO2023/042375
PCT Pub. Date: Mar. 23, 2023

(65) Prior Publication Data
US 2024/0385078 A1 Nov. 21, 2024

(51) Int. Cl.
G01M 11/00 (2006.01)

(52) U.S. Cl.
CPC ................................. G01M 11/31 (2013.01)

(58) Field of Classification Search
CPC ...... G01M 11/31; G01M 11/00; G01M 11/02; G01N 21/17
USPC ........................ 356/73.1, 479, 491, 487, 495
See application file for complete search history.

(56) References Cited

U.S. PATENT DOCUMENTS 5,321,501 A * 6/1994 Swanson ............ G01B 9/02019
356/73.1
5,596,409 A * 1/1997 Marcus .............. G01B 9/02009
356/479

5,757,485 A * 5/1998 Marcus .................. H04N 23/54
356/497
7,508,524 B2 * 3/2009 Mahadevan-Jansen ......................
G01B 9/0203
356/73
8,379,945 B2 * 2/2013 Hirota .................. A61B 5/0066
382/128
2003/0086093 A1 * 5/2003 Bush .................. G01B 9/02007
356/479

(Continued)

OTHER PUBLICATIONS

W. V. Sorin and D. F. Gray, "Simultaneous Thickness and Group Index Measurement Using Optical Low-Coherence Reflectometry," IEEE Photon. Technol. Lett., vol. 4, No. 1, pp. 105-107, 1992.

*Primary Examiner* — Isiaka O Akanbi

(74) *Attorney, Agent, or Firm* — Harness, Dickey & Pierce, P.L.C.

(57) ABSTRACT

The present disclosure is a light reflection measurement device including: a first light source for outputting first continuous light; a second light source for outputting second continuous light as local light; and a signal processing unit for performing digital signal processing on a light reception signal I(t) obtained by multiplexing reflected light that is obtained by irradiating a measurement target with one branched light of the first continuous light, reference light that is the other branched light of the first continuous light, and the local light, in which the signal processing unit calculates an autocorrelation function between the light reception signal I (t) and a light reception signal I (t+τ) obtained by shifting the light reception signal by time τ, and measures reflection on the measurement target by using a position of a peak of the autocorrelation function.

7 Claims, 3 Drawing Sheets

[1]

(56)  References Cited

U.S. PATENT DOCUMENTS

2006/0274318 A1* 12/2006 Jensen ................. G01M 11/332
                                                    356/477
2009/0262337 A1* 10/2009 Nicholson ........... G01M 11/331
                                                    356/73.1
2013/0229662 A1*  9/2013 Ogawa ................. G01M 11/335
                                                    356/453

* cited by examiner

OPTICAL REFLECTOMETRY DEVICE AND METHOD

CROSS-REFERENCE TO RELATED APPLICATIONS

This application is a 371 U.S. National Phase of International Application No. PCT/JP2021/034316, filed on Sep. 17, 2021. The entire disclosure of the above application is incorporated herein by reference.

TECHNICAL FIELD

The present disclosure relates to light reflection measurement device and method.

BACKGROUND ART

There is a low coherence light reflection measurement method (Hereinafter, referred to as "optical low coherence reflectometer (OLCR)".) as one of light reflection measurement methods used for diagnosis of a failure location of an optical waveguide, analysis of a shape and a structure of an object, and the like. The outline of the OLCR is as described in Non Patent Literature 1. Specifically, the measurement method is a method in which continuous light is branched, one branched light strikes a measurement target, the other branched light is reflected by a movable reflective element, and an interference signal between reflected light from the measurement target and reflected light from the movable reflective element is used. A strong interference signal is obtained when the propagation delay time of the reflected light from the movable reflective element and the propagation delay time of the reflected light from the measurement target match, so that it is possible to analyze the reflectance distribution of the measurement target with respect to the light propagation direction by observing the interference signal with the position of the movable reflective element changed.

CITATION LIST

Non Patent Literature

Non Patent Literature 1: W. V. Sorin and D. F. Gray, "Simultaneous Thickness and Group Index Measurement Using Optical Low-Coherence Reflectometry," IEEE Photon. Technol. Lett., Vol. 4, No. 1, pp. 105-107, 1992.

SUMMARY OF INVENTION

Technical Problem

In the conventional OLCR, unless measurement is performed with the position of the movable reflective element changed to adjust the optical path length accurately, reflection at any positions in the light propagation direction of the measurement target cannot be measured. For this reason, an accurate optical system design and a stable optical system installation environment are required, and it may be difficult to perform measurement. In addition, there is a problem that the measurable distance range is limited to the movable range of the movable reflective element.

The present disclosure has been made in view of the above circumstances, and an object of the present disclosure is to provide a technology for omitting accurate adjustment of an optical system, simplifying measurement, and expanding a measurable distance range in measuring reflection at a certain position in a light propagation direction of a measurement target.

Solution to Problem

Specifically, a light reflection measurement device according to the present disclosure includes:

a first light source for outputting first continuous light;

a second light source for outputting second continuous light as local light; and a signal processing unit for performing digital signal processing on a light reception signal I(t) obtained by multiplexing reflected light that is obtained by irradiating a measurement target with one branched light of the first continuous light, reference light that is the other branched light of the first continuous light, and the local light, in which the signal processing unit calculates an autocorrelation function between the light reception signal I (t) and a light reception signal I (t+τ) obtained by shifting the light reception signal by time τ, and measures reflection on the measurement target by using a position of a peak of the autocorrelation function.

Specifically, a light reflection measurement method according to the present disclosure includes:

branching first continuous light from a first light source;

multiplexing reflected light that is obtained by irradiating a measurement target with one branched light of the first continuous light thereof, reference light that is the other branched light of the first continuous light, and local light from a second light source;

receiving multiplexed light obtained by the multiplexing;

calculating an autocorrelation function between a light reception signal I (t) obtained by the receiving and a light reception signal I (t+τ) obtained by shifting the light reception signal by time τ; and measuring reflection on the measurement target by using a position of a peak of the autocorrelation function.

Advantageous Effects of Invention

According to the present disclosure, it is practical to measure reflection of a measurement target in each light propagation direction z by acquiring a light reception signal I (t) of multiplexed light, obtained by multiplexing reflected light, reference light and local light, and calculating an autocorrelation function between the light reception signal I (t) and a light reception signal I (t+τ) obtained by shifting the light reception signal I (t) by time τ. Therefore, in the present disclosure, it is practical to measure reflection at a certain position in the light propagation direction of the measurement target without adjusting the optical path length by the movable reflective element. In the present disclosure, it is not necessary to adjust the optical path length by the movable reflective element, and thus, there is no limitation due to the movable range of the movable reflective element. Accordingly, the present disclosure can provide a technology for omitting accurate adjustment of an optical system, simplifying measurement, and expanding a measurable distance range in measuring reflection at a certain position in a light propagation direction of a measurement target.

BRIEF DESCRIPTION OF DRAWINGS

FIG. 2 is a conceptual diagram of a result of calculating an autocorrelation function in the present disclosure.

FIG. 3 is a block diagram illustrating the configuration of a device in an embodiment of the present disclosure.

DESCRIPTION OF EMBODIMENTS

Figure 1:
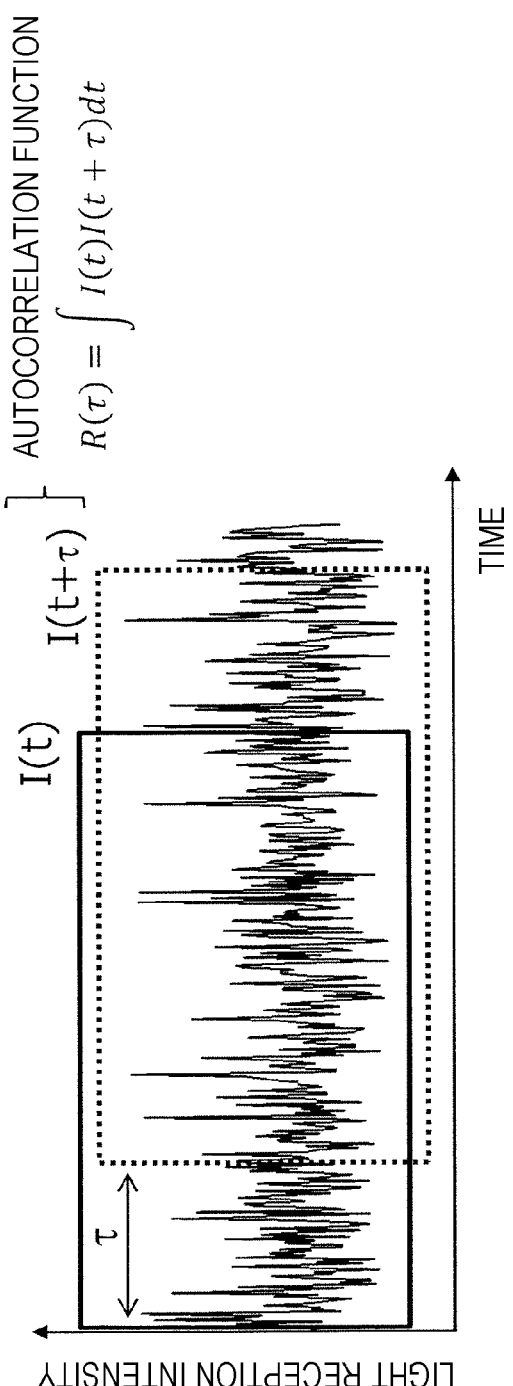
FIG. 1 is a conceptual diagram of a method for calculating an autocorrelation function in the present disclosure.

Hereinafter, embodiments of the present disclosure will be described in detail with reference to the drawings. Note that the present disclosure is not limited to the embodiments described below. These embodiments are merely examples, and the present disclosure can be carried out in forms with various modifications and improvements based on the knowledge of those skilled in the art. Components having the same reference numerals in the present specification and the drawings are the same components.

A light reflection measurement device of the present disclosure includes: a first light source that outputs first continuous light injected into a measurement target; and a second light source that outputs second light functioning as local light. In the present disclosure, two types of optical waves, that is, reflected light that is obtained by branching the first continuous light and irradiating the measurement target with one branched light and reference light that does not strike the measurement target are generated, optical waves obtained by multiplexing the reflected light and the reference light are multiplexed with local light having high coherence to perform coherent detection, and a signal obtained by the coherent detection is subjected to digital autocorrelation processing, thereby implementing light reflection measurement without performing accurate optical system adjustment.

There are a plurality of reflection points in the measurement target (reference numeral 20 illustrated in FIG. 3), and each reflection point is identified by i. As an example of the measurement target 20, in addition to an optical fiber, an optical device such as a silicon optical waveguide, and other biological tissues such as a skin and an eyeball can be considered. Light reflection measurement for a living tissue is also called optical coherence tomography (OCT). The distance z represents a distance in the longitudinal direction from the optical circulator (reference numeral 24 illustrated in FIG. 3), and the distance $z_i$ represents a distance z at which the reflection point i is present. For example, when the optical circulator 24 and the measurement target 20 are connected by an optical fiber having a length of 1 m and a reflection point exists at a point of 0.01 m in the longitudinal direction in the measurement target 20, the reflection point is observed to exist at a point of 1.01 m in this measurement. Given that a complex electric field amplitude of the reference light is $E_0$ (t), a complex electric field amplitude $E_i$ (t) of the reflected light from the distance $z_i$ in the measurement target is expressed by the following expression.

[Math. 1]

$$E_i(t) = \sqrt{r_i}\, E_0(t - \tau_i) \tag{1}$$

Here, given that $\tau_i$ is a propagation delay time of the reflected light from the distance $z_i$ and the light propagation speed is v, there is a relationship of $\tau_i = 2z_i/v$ with respect to $z_i$. $r_i$ is the reflectance of the reflection point i at the position of the distance $z_i$.

Given that a complex electric field amplitude of the local light is $E_{lo}$ (t), a light reception signal I (t) obtained by coherent detection is expressed by the following expression.

[Math. 2]

$$I(t) = \left| E_0(t) + \sum_i E_i(t) + E_{lo}(t) \right|^2 = \left| E_0(t) + \sum_i \sqrt{r_i}\, E_0(t - \tau_i) + E_{lo}(t) \right|^2 \tag{2}$$

Here, $\Sigma$ regarding i represents the sum regarding a plurality of reflection points existing in the measurement target.

Assuming that the local light intensity is sufficiently higher than the light intensity of the first continuous light, and the interference component between rays of reflected light, the interference component between rays of reference light, and the interference component between a ray of reflected light and a ray of reference light are negligible, I (t) can be expressed as the following expression.

[Math. 3]

$$I(t) \cong I_0(t) + \sum_i I_i(t) \tag{3}$$

[Math. 4]

$$I_0(t) \equiv E_0(t)E_{lo}^*(t) + E_0^*(t)E_{lo}(t) \tag{4}$$

[Math. 5]

$$I_i(t) \equiv \sqrt{r_i}\, E_0(t - \tau_i)E_{lo}^*(t) + \sqrt{r_i}\, E_0^*(t - \tau_i)E_{lo}(t) \tag{5}$$

Next, an autocorrelation function R ($\tau$) of I (t) is calculated. FIG. 1 illustrates a calculation image of R ($\tau$). Regarding R ($\tau$), a time integral of a product of I (t) and a waveform I (t+$\tau$), obtained by shifting I (t) by a certain time $\tau$, is calculated as a function of $\tau$. R ($\tau$) is calculated by digital signal processing on the basis of the following expression.

[Math. 6]

$$R(\tau) = \int I(t)I(t + \tau)\, dt \tag{6}$$

$$= \int I_0(t)I_0(t + \tau)\, dt + \sum_i \int I_i(t)I_i(t + \tau)\, dt$$

$$+ \sum_i \left[ \int I_0(t)I_i(t + \tau)\, dt + \int I_i(t)I_0(t + \tau)\, dt \right]$$

$$+ \sum_i \sum_j \left[ \int I_i(t)I_j(t + \tau)\, dt + \int I_i(t)I_j(t + \tau)\, dt \right]$$

When the complex electric field amplitude $E_i$ (t) of the reflected light is sufficiently smaller than the complex electric field amplitude $E_0$ (t) of the reference light ($r_i \ll 1$), the fourth term is negligible in Expression (6). The first to the third terms are calculated by the expressions below.

[Math. 7]

$$\int I_0(t)I_0(t + \tau)\, dt = \int E_0(t)E_0^*(t + \tau)E_{lo}^*(t)E_{lo}(t + \tau)\, dt + c.c. \tag{7}$$

[Math. 8]

$$\int I_i(t)I_i(t + \tau)\, dt = r_i \int E_0(t - \tau)E_0^*(t - \tau_i + \tau)E_{lo}^*(t)E_{lo}(t + \tau)\, dt + c.c. \tag{8}$$

-continued

[Math. 9]

$$\int I_0(t) I_i(t+\tau)\,dt = \sqrt{r_i} \int E_0(t) E_0^*(t - \tau_i + \tau) E_{lo}^*(t) E_{lo}(t+\tau)\,dt + c.c. \quad (9)$$

[Math. 10]

$$\int I_i(t) I_0(t+\tau)\,dt = \sqrt{r_i} \int E_0(t - \tau_i) E_0^*(t+\tau) E_{lo}^*(t) E_{lo}(t+\tau)\,dt + c.c. \quad (10)$$

Here, c.c. represents a complex conjugate. When the coherence time of the local light is sufficiently long with respect to a possible value of $\tau$, $E^*_{lo}$ (t) $E_{lo}$ (t+$\tau$) and its complex conjugate can be regarded as a constant that does not depend on t.

When the coherence time of the first continuous light from the low coherence light source 11 is sufficiently short with respect to a possible value of $\tau$, it can be considered that the following expression holds.

[Math. 11]

$$\int E_0(t) E_0^*(t - \tau)\,dt = \int E_0^*(t) E_0(t - \tau)\,dt \propto \begin{cases} 1 & (\tau = 0) \\ 0 & (\tau \ne 0) \end{cases} \quad (11)$$

Therefore, applying Expression (11) to Expressions (7) to (10) results in the following.

[Math. 12]

$$\int I_0(t) I_0(t+\tau)\,dt \propto \begin{cases} 1 & (\tau = 0) \\ 0 & (\tau \ne 0) \end{cases} \quad (12)$$

[Math. 13]

$$\int I_i(t) I_i(t+\tau)\,dt \propto \begin{cases} 1 & (\tau = 0) \\ 0 & (\tau \ne 0) \end{cases} \quad (13)$$

[Math. 14]

$$\int I_0(t) I_i(t+\tau)\,dt \propto \begin{cases} 1 & (\tau = \tau_i) \\ 0 & (\tau \ne \tau_i) \end{cases} \quad (14)$$

[Math. 15]

$$\int I_i(t) I_0(t+\tau)\,dt \propto \begin{cases} 1 & (\tau = -\tau_i) \\ 0 & (\tau \ne -\tau_i) \end{cases} \quad (15)$$

Given that Expressions (12) to (15) are substituted into Expression (6), R (t) and [R ($\tau$)]$^2$ are expressed as the following expressions.

[Math. 16]

$$R(\tau) \propto \sum_i \sqrt{r_i}\,\delta_{\tau,\tau_i} \quad (16)$$

[Math. 17]

$$[R(\tau)]^2 \propto \sum_i r_i \delta_{\tau,\tau_i} \quad (17)$$

Here, $\delta_{\tau,\,\tau_i}$ is Kronecker delta, and is a function defined by the following expression.

[Math. 18]

$$\delta_{\tau,\tau_i} = \begin{cases} 1 & (\tau = \tau_i) \\ 0 & (\tau \ne \tau_i) \end{cases} \quad (18)$$

Figure 2:
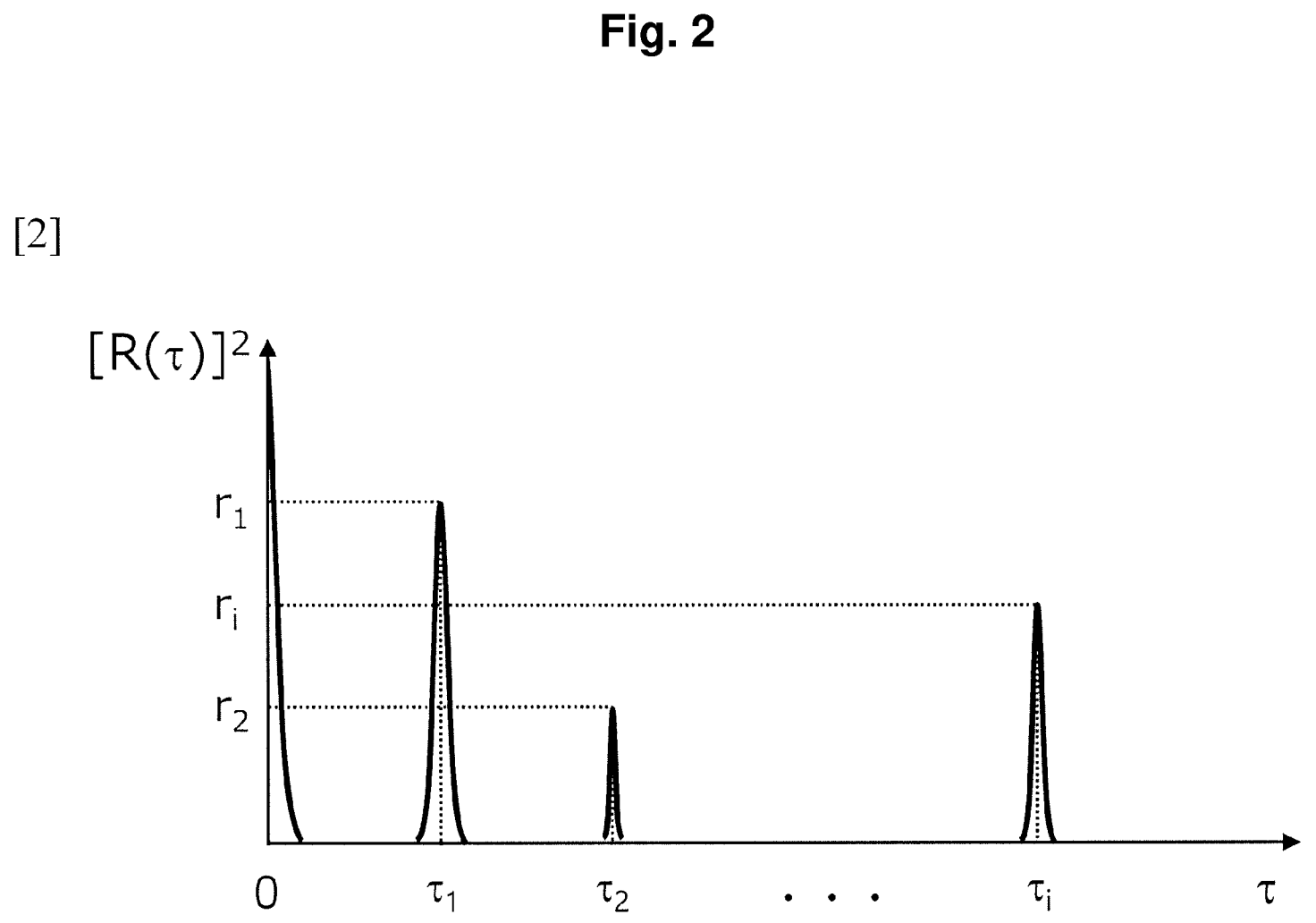

FIG. 2 illustrates a waveform image of [R ($\tau$)]$^2$ expressed by Expression (17). [R ($\tau$)]$^2$ represents the reflectance distribution of the measurement target, as a function of $\tau$, and has a peak of intensity proportional to the reflectance at the position of the delay time $\tau_i$ corresponding to the reflection point i. Since $\tau_i$ has a relation of $\tau_i = 2\,z_i/v$ with respect to the distance $z_i$, Expression (17) can be replaced with a function of the distance z. As a result, the reflectance distribution of the measurement target with respect to the distance $z_i$ in the light propagation direction is obtained.

Figure 3:
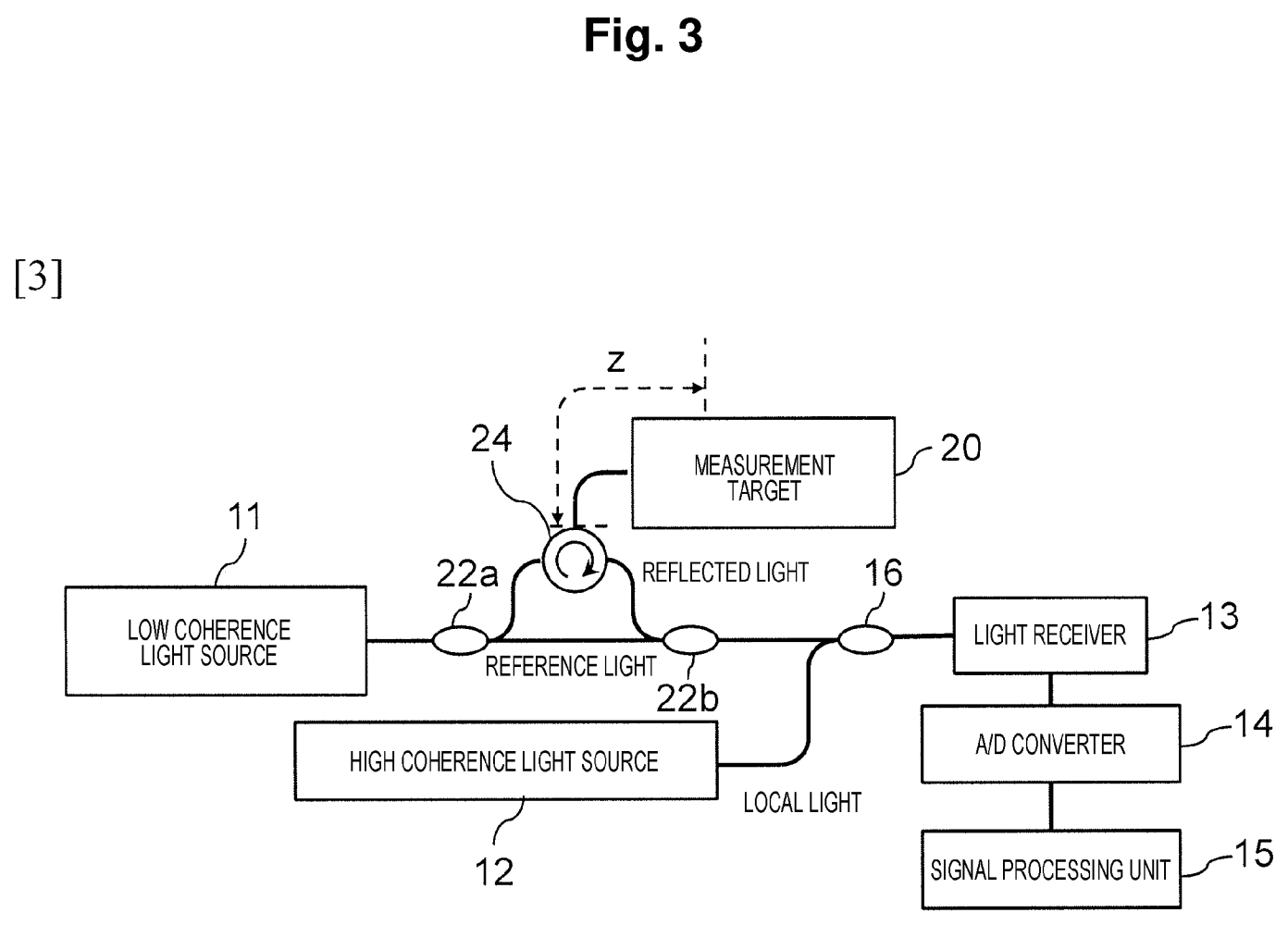

FIG. 3 is a block diagram illustrating a device configuration of the light reflection measurement device 10 according to the present embodiment. A low coherence light source 11 and a high coherence light source 12 are used as the light sources. The low coherence light source 11 functions as a first light source, and the high coherence light source 12 functions as a second light source. The first continuous light output from the low coherence light source 11 is branched at a coupler 22a, and one of the branched light strikes the measurement target 20 via the optical circulator 24. In the present embodiment, an example in which an optical fiber is connected to the optical circulator 24, the measurement target 20 is connected to the optical fiber, and light is reflected at a certain position inside the measurement target 20 will be described. When the measurement target 20 is an object in which a space exists, a lens may be provided between the optical fiber, connecting the optical circulator 24 and the measurement target 20, and the measurement target 20 in order to enhance efficiency of irradiation of incident light and collection of reflected light. This facilitates measurement of reflected light reflected in the space.

The reflected light from the measurement target 20 is propagated to the coupler 22b via the optical circulator 24, and multiplexed with the reference light at the coupler 22b. The light obtained by multiplexing the reflected light and the reference light is further multiplexed with the local light, output from the high coherence light source 12, at the coupler 16. In the light reflection measurement device 10, the light, obtained by multiplexing the reflected light, the reference light and the local light, is converted into an electric signal by a light receiver 13. The light reception signal that is the electrical signal obtained by the conversion is converted into a digital signal by the A/D converter 14 and transferred to the signal processing unit 15.

The signal processing unit 15 calculates the autocorrelation function R ($\tau$) and its square [R ($\tau$)]$^2$ by Expression (6) using the light reception signal I (t) that is the digital signal obtained by the conversion. Specifically, the signal processing unit 15 calculates an autocorrelation function R ($\tau$) between the light reception signal I (t) and the light reception signal I (t+$\tau$) obtained by shifting the light reception signal by the time $\tau$. Then, the signal processing unit 15 converts the delay time $\tau$ into the distance z using the relationship of $\tau = 2\,z/v$ with respect to [R ($\tau$)]$^2$, and obtains the reflectance distribution of the measurement target 20.

The low coherence light source 11 used in the present embodiment has coherence time shorter than $2\Delta z/v$ where a spatial resolution required for diagnosing and analyzing the measurement target 20 is $\Delta z$, and the high coherence light source 15 has coherence time longer than 2 $z_{max}/v$ where a measurement distance range required for measuring the measurement target 20 is $z_{max}$.

The signal processing unit 15 can also be implemented on a computer and in a program, and the program can be recorded on a recording medium or be provided through a network. In the above-described embodiment, although the reflected light and the reference light are multiplexed at the coupler 22*b* and then the multiplexed light and the local light are multiplexed at the coupler 16, the present disclosure is not limited thereto. For example, after the reflected light and the local light are multiplexed, the multiplexed light and the reference light may be multiplexed. The reflected light, the reference light, and the local light may be multiplexed by one device.

According to the present disclosure, it is practical to implement light reflection measurement without performing optical path length adjustment by a movable reflective element such as a conventional OLCR. This simplifies the measurement as compared with the conventional OLCR, and enables light reflection measurement in a wide measurement range exceeding the measurement limit due to the conventional optical path length movable range.

INDUSTRIAL APPLICABILITY

The present disclosure can be applied to the information and communications industry.

REFERENCE SIGNS LIST

10 Light reflection measurement device
11 Low coherence light source
12 High coherence light source
13 Light receiver
14 A/D converter
15 Signal processing unit
16 Coupler
20 Measurement target
22 Coupler
24 Optical circulator

The invention claimed is:

1. A light reflection measurement device comprising:
a first light source for outputting first continuous light;
a second light source for outputting second continuous light as local light; and
a signal processing unit for performing digital signal processing on a light reception signal obtained by multiplexing reflected light that is obtained by irradiating a measurement target with one branched light of the first continuous light, reference light that is the other branched light of the first continuous light, and the local light,
wherein the signal processing unit calculates an autocorrelation function between the light reception signal and a light reception signal obtained by shifting the light reception signal, and measures reflection on the measurement target by using a peak of the autocorrelation function.

2. The light reflection measurement device according to claim 1,
wherein the signal processing unit determines a position of the measurement target, in a light propagation direction, based on a position of the peak of the autocorrelation function.

3. The light reflection measurement device according to claim 1,
wherein the signal processing unit calculates a square of the autocorrelation function, and obtains a reflectance on the measurement target by using intensity of a peak of the square of the autocorrelation function.

4. The light reflection measurement device according to claim 1,
wherein the signal processing unit obtains a reflectance distribution on the measurement target from the intensity and a position of the peak of the square of the autocorrelation function.

5. The light reflection measurement device according to claim 1, wherein:
a light propagation speed in the measurement target is v,
a first coherence time of the first continuous light is shorter than a $2\Delta z/v$ where $\Delta z$ is a spatial resolution necessary for measuring a reflectance distribution on the measurement target, and
a second coherence time of the second continuous light is longer than $2z_{max}/v$ where $z_{max}$ is a measurement distance range measurable by a low coherence light reflection measurement method.

6. The light reflection measurement device according to claim 1,
wherein a first intensity of the reference light is greater than a second intensity of the reflected light.

7. A light reflection measurement method comprising:
branching first continuous light and irradiating a measurement target with one branched light thereof;
multiplexing reflected light on the measurement target, the other branched light of the first continuous light, and local light output from a second light source different from the first continuous light;
receiving multiplexed light obtained by the multiplexing;
calculating an autocorrelation function between a light reception signal obtained by the receiving and a light reception signal obtained by shifting the light reception signal; and
measuring reflection on the measurement target by using a peak of the autocorrelation function.

\* \* \* \* \*